(12) United States Patent
Lawrenz et al.

(10) Patent No.: US 9,511,879 B1
(45) Date of Patent: Dec. 6, 2016

(54) WIRELESS DOOR MONITORING SYSTEM FOR USE ON AIRCRAFT EXTERIOR ACCESS PANELS

(71) Applicant: GSO Aviation, Inc., Danville, VA (US)

(72) Inventors: Kyle Lawrenz, Waynesville, OH (US); Raimundo Rodriguez, Browns Summit, NC (US)

(73) Assignee: GSO Aviation, Inc., Danville, VA (US)

( * ) Notice: Subject to any disclaimer, the term of this patent is extended or adjusted under 35 U.S.C. 154(b) by 0 days.

(21) Appl. No.: 14/925,478

(22) Filed: Oct. 28, 2015

(51) Int. Cl.
*G08B 21/00* (2006.01)
*B64D 45/00* (2006.01)
*B64C 1/14* (2006.01)
*B64F 5/00* (2006.01)

(52) U.S. Cl.
CPC ......... *B64D 45/0005* (2013.01); *B64C 1/1407* (2013.01); *B64F 5/0009* (2013.01)

(58) Field of Classification Search
CPC B64D 45/0005; B64C 1/1407; B64F 5/0009
USPC ....................................................... 340/945
See application file for complete search history.

(56) References Cited

U.S. PATENT DOCUMENTS

| | | | |
|---|---|---|---|
| 5,410,488 A | 4/1995 | Andersen, III | 364/482 |
| 7,414,530 B2 | 8/2008 | Rieckmann | 340/545.1 |
| 7,417,542 B2 | 8/2008 | Bruch | 340/545.1 |
| 7,994,940 B2 | 8/2011 | Grichener et al. | 340/945 |
| 8,022,843 B2 * | 9/2011 | Mitchell | H01Q 1/007 340/945 |
| 8,149,118 B2 | 4/2012 | Niesen et al. | 340/545.2 |
| 8,344,912 B2 | 1/2013 | Mitchell et al. | 340/973 |
| 8,798,817 B2 | 8/2014 | O'Dell et al. | 701/14 |
| 8,963,691 B1 | 2/2015 | Mitchell et al. | 340/10.42 |
| 9,113,234 B2 | 8/2015 | Mitchell et al. | 340/572.3 |
| 2003/0038713 A1 * | 2/2003 | Plude | B64C 1/14 340/426.1 |
| 2007/0176793 A1 * | 8/2007 | Bruch | B60R 25/1003 340/945 |

OTHER PUBLICATIONS

NRF24L01 Single Chip 2.4 GHz Transceiver Product Specification, Nordic Semiconductor, Jul. 2007.
Atmel, 8-bit AVR Microcontroller with 4/8/16/32K Sytes In-System Programmable Flash, AVR Doc. Oct. 2009.

* cited by examiner

*Primary Examiner* — Kerri McNally
(74) *Attorney, Agent, or Firm* — MacCord Mason PLLC

(57) ABSTRACT

An apparatus monitors doors on an aircraft. A system monitor has a circuit with an interrogation switch, a receiver, a plurality of red lights and at least one green light source. A plurality of door sensor units each has a housing with a protruding limit switch having a door-open position and a door-closed position. Each limit switch is in a sensor circuit with a battery and a transmitter. The sensor circuit transmits with a unique transmission if the limit switch is in the door-open position. If the system monitor receives a door-open position signal from one of the door sensor units when the interrogation switch is activated, a corresponding one of the red lights is illuminated, and if the system monitor receives all door-closed position signals, the green light is illuminated.

13 Claims, 6 Drawing Sheets

WIRELESS DOOR MONITORING SYSTEM FOR USE ON AIRCRAFT EXTERIOR ACCESS PANELS

BACKGROUND OF THE INVENTION

The invention relates to a system to be mounted onto aircraft doors, particularly in retrofit situations, but it could also be used for new aircraft assembly. Aircraft fuselages have a number of doors in addition to the primary doors that passengers enter and leave from, these additional doors being used by ground crew while the aircraft is on the ground. During commercial aviation operations, the crew has to work quickly to perform its various functions, accessing systems on the aircraft through these access doors. When the ground crew person is through with that task, he or she is to close the door to secure and latch it with a cam lock or thumb latch. While this is successful in most cases, occasionally the door is not closed completely, which can cause serious problems during flight. The open door not only can cause wind noise, but can fly off and fall to the ground, or cause damage to the aircraft. In either case, the aircraft must return to ground prematurely which can have its own negative consequences, particularly if it is landing with a full load of fuel, resulting in a hard landing that can necessitate further servicing, passengers missing connecting flight, aircraft being re-routed. Thus there is a need for a further system to allow a pilot or other user to make a final check that all of the doors are closed before takeoff.

SUMMARY OF THE INVENTION

The present invention fulfills one or more of these needs in the art by providing an apparatus for monitoring doors on an aircraft. A system monitor has a circuit with an interrogation switch, a receiver, a plurality of light sources of a first color and at least one light source of a second color. When the interrogation switch is activated, the system monitor is able to receive signals from door sensor units. The apparatus includes a plurality of door sensor units, each having a housing with a protruding limit switch. The limit switches each have a door-open position and a door-closed position and are in a sensor circuit with a battery and a transmitter such that battery voltage is only applied to the sensor circuit when the limit switch is in the door-open position. The sensor circuit is configured so that when the limit switch is in the door-open position the sensor circuit's transmitter transmits a signal. Each of the transmitters of the door sensor units transmits a unique identifier that is different from the other door sensor units. If the system monitor receives a transmission from one of the door sensor units of a door-open position signal, a corresponding one of the plurality of lights of the first color is illuminated, and if the system monitor receives no door-open position signals from the door sensor units, the light of the second color is illuminated. Other signaling devices can be substituted for the colored lights Typically, the first color is red and the second color is green.

The system monitor is preferably configured not to receive unless the interrogation switch is activated. The door sensor unit is preferably configured so that it transmits only when the limit switch is in the door open position.

The door sensor housing may include a base plate configured to mount to a surface inside a cavity behind an aircraft door and a cap to mount over the base plate to encapsulate the sensor circuit, with the limit switch protruding from the cap. Preferably, the cap is removable for battery replacement. The door sensor unit may have a light that comes on when the limit switch is in the door-open position to indicate proper functioning of the door sensor unit.

The invention can also be viewed as a method of retrofitting aircraft to allow monitoring of access panel door positions. The method includes mounting in a cockpit of an aircraft a system monitor having a circuit with an interrogation switch, a receiver, a plurality of light sources of a first color and at least one light source of a second color. The method also includes mounting a door sensor unit behind each of a plurality of access panel doors on the aircraft, each door sensor having a housing with a protruding limit switch, the limit switch having a door-open position and a door-closed position and being in a sensor circuit with a battery and a transmitter. When the limit switch is in the door-open position, the sensor circuit transmits a signal with a unique identifier, so that each transmitter of the door sensor units transmits an identifier that is different from the other door sensor units. The system monitor can receive a transmission from one of the door sensor units of a door-open position signal and illuminate a corresponding one of the plurality of lights of the first color. If the system monitor receives no door-open position signals from the door sensor units, the light of the second color is illuminated.

Typically, the method includes installing a system monitor whose first color is red and second color is green.

Mounting the door sensor may include mounting a base plate to a surface inside a cavity behind an aircraft door and mounting a cap over the base plate to encapsulate the sensor circuit, with the limit switch protruding from the cap to be activated by the opening and closing of the aircraft door.

BRIEF DESCRIPTION OF THE DRAWINGS

The invention will be better understood by a reading of the Detailed Description of the Examples of the Invention along with a review of the drawings, in which.

DETAILED DESCRIPTION OF EXAMPLES OF THE INVENTION

Figure 1:
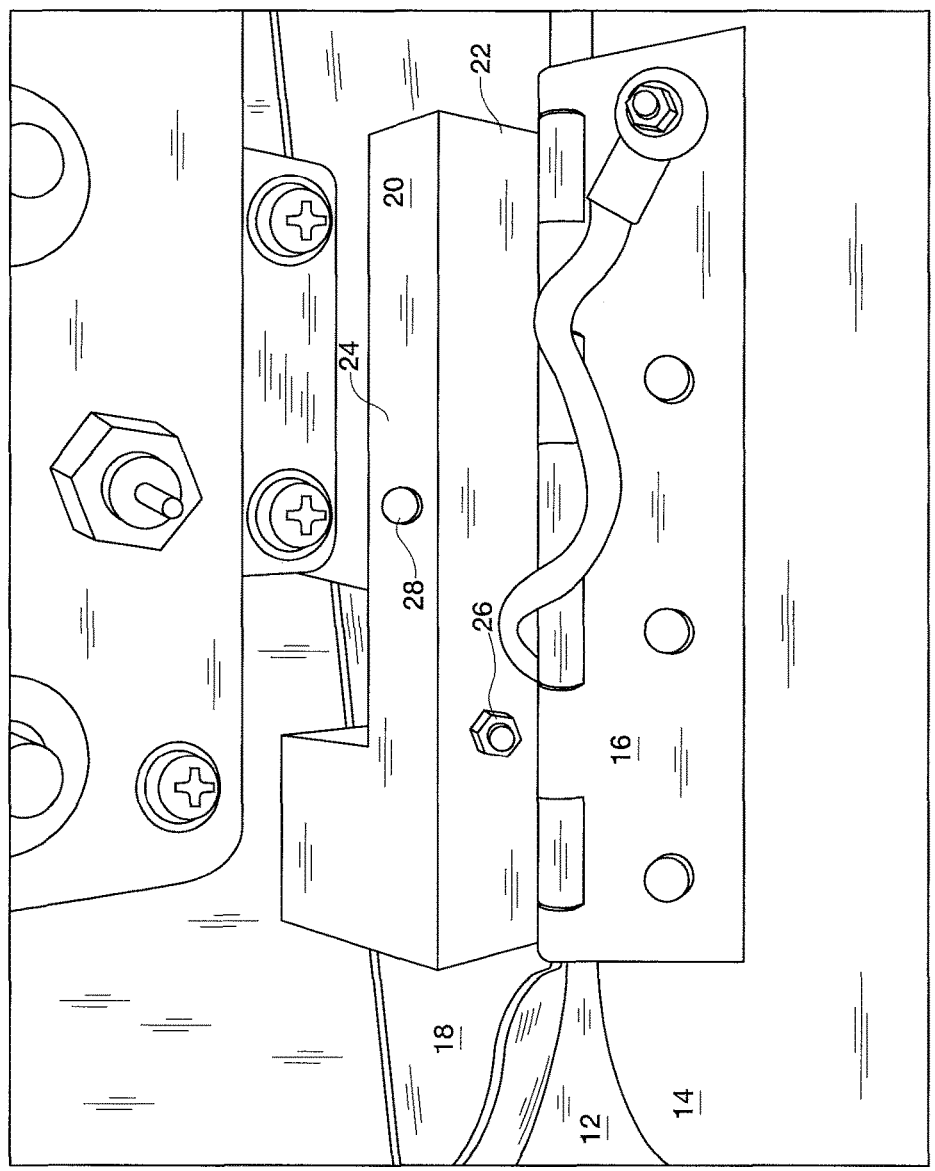
FIG. 1 is a perspective view of an access panel of an aircraft equipped with a door position sensor.

The wireless door monitoring system includes a cockpit system monitor and at least one door sensor unit. Embodiments enable testing for open doors during and after pushback from a gate. This system will indicate to the crew if a comm door, external power door, or any other door equipped with the door sensor has been left open. The flight crew can instruct the ground crew to close the appropriate door(s) and verify this has been done via the cockpit test and monitor panel.

The cockpit test unit includes red door-open indicating LEDs, a flashing green door-closed indication LED, a system monitor push button, and a lamp test push button. Other signaling methodologies can be substituted for the LED's, such as audible tones or visual cues made differently than by lighting lights.

The door sensor unit includes a mounting plate, a cap and a push button. The door sensor unit is mounted just inside the door being monitored, so that closing of the door pushes the push button, i.e. closes a limit switch. The button is extended, typically by a spring, when the door is open, causing the limit switch to be in the door-open position.

When a door is opened and the system monitor test is performed, the cockpit system monitor will display information about which, if any, doors are open. If no doors are open, the unit will indicate all doors are closed.

The flight crew will close all doors except the door that external power is hooked to and the external services door if the ground crew has a headset hooked up to it. For security checks the flight crews are supposed to look inside accessible areas before the flight, which includes looking behind the access panel doors. The ground crew personnel are the last people to use those doors, and they disconnect external power and unplug the headset from the external services panel. At this point in time the pilots cannot get back outside to see the doors.

Each of the access panels that has door is equipped with a sensor with a limit switch that is closed when the door is properly closed. Each door sensor is housed in a separate, small compartment that can fit inside the space behind an access door. Each door sensor has a circuit that transmits uniquely to a system monitor in the cockpit. The signals from the door sensor can be made unique in several ways, such as by transmitting a unique data string, transmitting over a unique frequency, or other methodologies that will be apparent to those of ordinary skill in the art. Therefore, the sensors at each of the various doors on the aircraft transmit uniquely, so that the system monitor in the cockpit can distinguish one door sensor from another. The cockpit system monitor has a red light for each door that illuminates when that door is open at test time. If all doors are closed at test time, a green light illuminates.

The pilot already has a preflight checklist that requires him to walk around the aircraft to check in the openings behind the doors for any dangers. When he does this, he can see a red light on the sensor for that door indicating that the sensor is operational. If the light is off when the door is open, a malfunction (most likely a battery failure) is indicated.

When the pilot is in the cockpit and ready to pull away from the gate, part of his checklist will be to press the interrogation switch button on his cockpit system monitor, which will turn on the receiver in the system monitor to listen for transmissions from the various door sensors around the airplane. If the door of an access panel is closed, the door position sensor for the at access panel will not transmit, and the system monitor interprets the absence of a signal as indicating the door is closed. If the door is open, the sensor circuit is connected to the battery so it sends the system monitor with its unique identifier. Each door has a corresponding red light on the system monitor, so that if a particular door is open the system monitor can identify which door is open by the illumination of its red light. The pilot can then communicate with the ground crew to close the door that is open. When all the doors are closed and the system is not being tested, no signals are being sent by the door sensors or the cockpit module. If all of the doors are closed, no door sensor signals are transmitted and logic in the system monitor causes the single green light to illuminate when the system is tested.

The door sensor housing may have a relatively large, thin extension on the side of housing is for mounting the switch assembly to the existing hinge hardware. The body of the switch may be made reversible, and the indicator light can be mounted to the side of the battery compartment to make it visible in various configurations.

FIG. 1 is a perspective view of an access panel of an aircraft equipped with a door position sensor. As seen, the aircraft 12 has a cavity 18 where items that a ground crew needs to access can be reached. The cavity is covered by a door 14 held to the aircraft by hinge 16. Mounted to an interior face of the cavity is the door position sensor 20 in accordance with an embodiment of the invention. The sensor has a base plate 22 and a cap 24. The plate 22 and cap 24 can be separated to provide access to sensor components for service, particularly for battery replacement. Protruding toward the door 14 is a push button 26 that serves as a limit switch. A light 28 is mounted to the cap 24 and configured to illuminate when the limit switch extends when the door 14 is opened. Typically, an aircraft has several access panels similar to the one shown in FIG. 1 and preferably, each is equipped with a door position sensor as just described. The door position sensors are generally identical, except that each transmits differently than the others so the sensors can be identified by their unique transmission.

Figure 2:
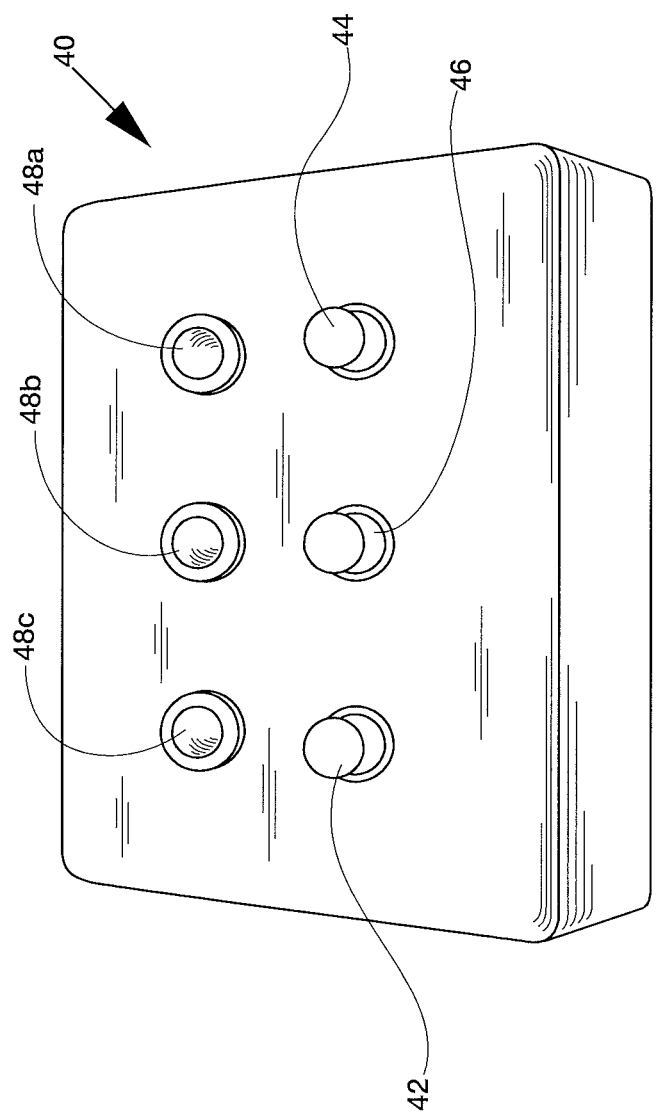
FIG. 2 is a perspective view of a system monitor that can be mounted in the aircraft cockpit.

FIG. 2 is a perspective view of a system monitor 40 that can be mounted in the aircraft cockpit. It includes a first push button 42 and a second push button 44. The first push button 42 is connected in a circuit so that the lights on the system monitor can be tested. The second push button 44 is connected in a circuit so that the status of the door position sensors can be interrogated. When button 44 is depressed, the receiver in monitor 40 turns on to listen for transmissions from one or more door sensors. If the door 14 for a sensor is open, that sensor will send its unique transmission, which is received by the monitor 40 and illuminates the corresponding one of lights 48a, 48b, or 48c. If more than one door is open, more than one light will illuminate. If no doors are open, the monitor will receive no transmissions and will interpret that lack of transmissions as indicating that all doors are closed and, instead, illuminate light 46. Light 46 is preferably green and lights 48a, 48b, and 48c are preferably red.

Figure 3:
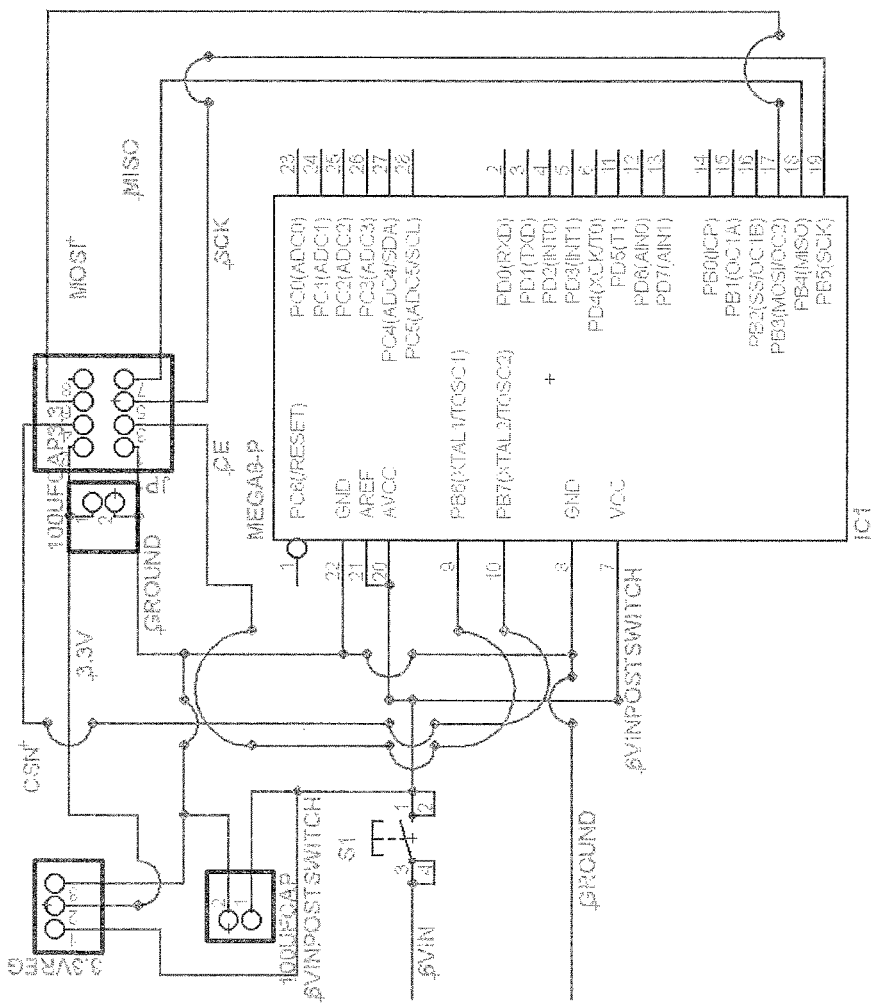
FIG. 3 is a circuit diagram of the door position sensor including its limit switch, sensor circuit, battery, and transmitter.

FIG. 3 is a circuit diagram of the door position sensor 20 including its limit switch 26, sensor circuit including battery and transmitter that are housed within the cap 24. The transmitter shown includes an integrated circuit and a radio chip. The circuit uses conventional integrated circuits, such as Atmega 8 Bit Microprocessors. A link to the data sheet for that chip is www.atmel.com/Images/doc8161.pdf. The radio chip can be an NRF24L01 radio chip available from Nordic Semiconductor, Trondheim, Norway. A link to a data sheet is at www.nordicsemi.com/eng/content/download/2730/34105/file/nRF24L01_Product_Specification_v2_0.pdf As seen, the radio chip is provided as a transceiver, but the invention can also be carried out with the transmitter only capable of transmitting.

In operation of the door sensor, voltage is applied from a battery to the 6VIN wire and returned through the ground. When the switch 26 is pushed in by the closing of the door 14 the battery circuit is opened, so nothing is transmitted since the battery is switched out of the circuit.

Once the door 14 is opened, power flows to the voltage inputs on IC1 and through the 3.3 volt regulator to chip JP1 at its 3.3 v input. The IC runs a program that sends timing signals between JP1 and IC1 through wires CSN, CE and SCK. The MOSI and MISO wires send information from the program running on the IC1 to and from the JP1, which sends out its signal to be read by the system monitor 40 in the cockpit. 100 microfarad capacitors are included to assist with voltage surges that may arise from the transmission.

Figure 4:
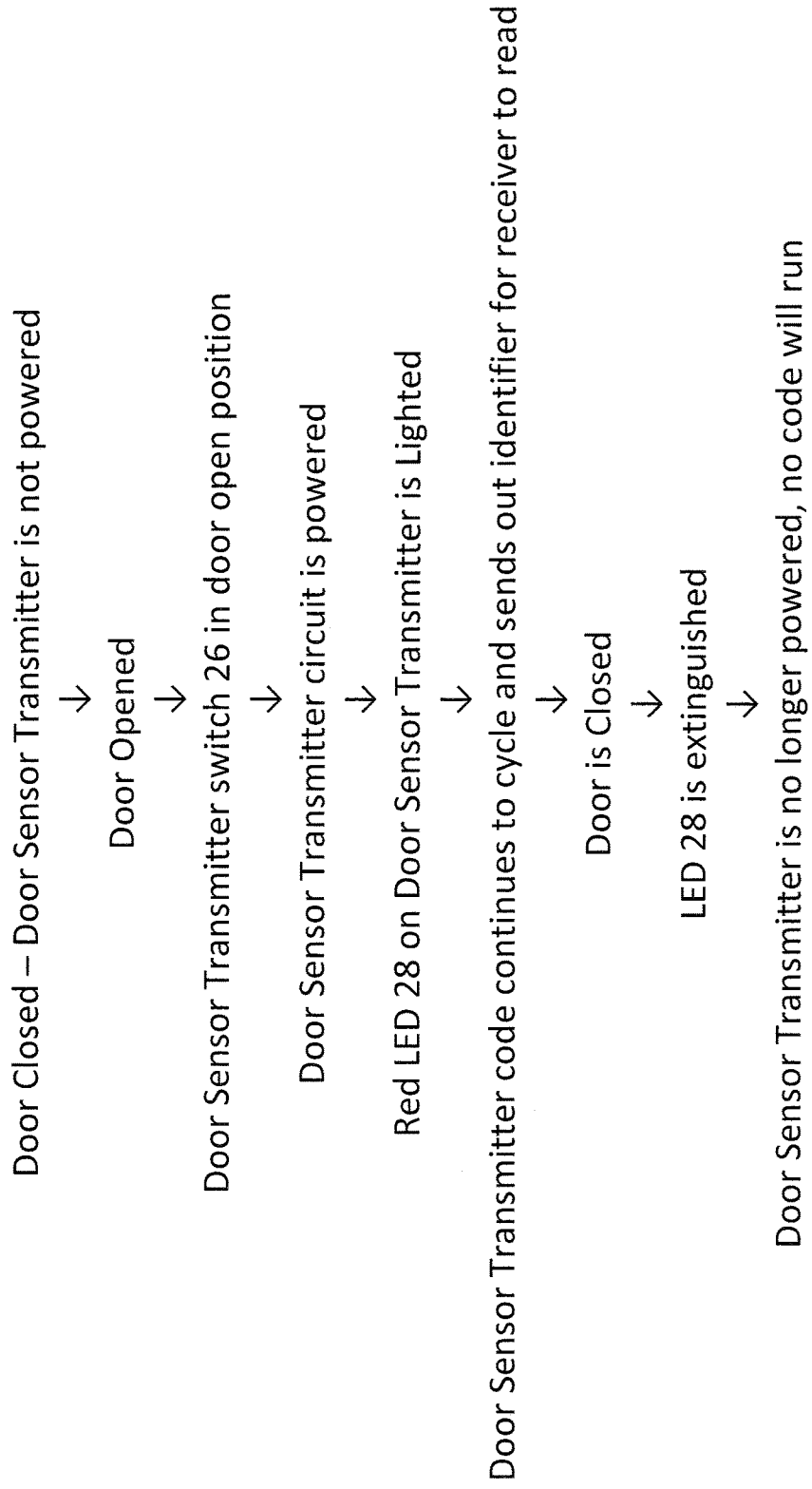
FIG. 4 is a flow chart for the operation of the door position sensor

FIG. 4 is a flow chart for the operation of the door position sensor showing the steps undertaken in the door position sensor. The program in the IC in each transmitter is programmed with a unique identifier, for example "123ABC." When the switch is closed to supply voltage to the integrated circuit, the IC is booted. The IC then sends the code "123ABC" to the NRF radio chip, along with instructions such as the transmission pipe (how the NRF reads and writes the digital signals), bandwidth range (2,400 to 2,483.5 GHz range in one embodiment), power setting and time for transmission. Then the program in the IC causes a brief pause so transmissions for any other open doors can have time to reach the receiver at the system monitor. Then the IC instructs the radio chip to send the code again. This process continues iteratively in a loop until power to the integrated circuit is terminated by closing the door, which disconnects the IC from the battery. The code in the IC only takes milliseconds to run through 1 complete cycle.

The NRF chip does not have the capacity to hold and transmit a specific identifier, so the IC stores and executes the code and other info for transmission. Different arrangements of integrated circuit and radio can be substituted to make the transmitter.

FIG. 4 is a flow chart for the operation of the door position sensor showing the steps outlined above.

Figure 5:
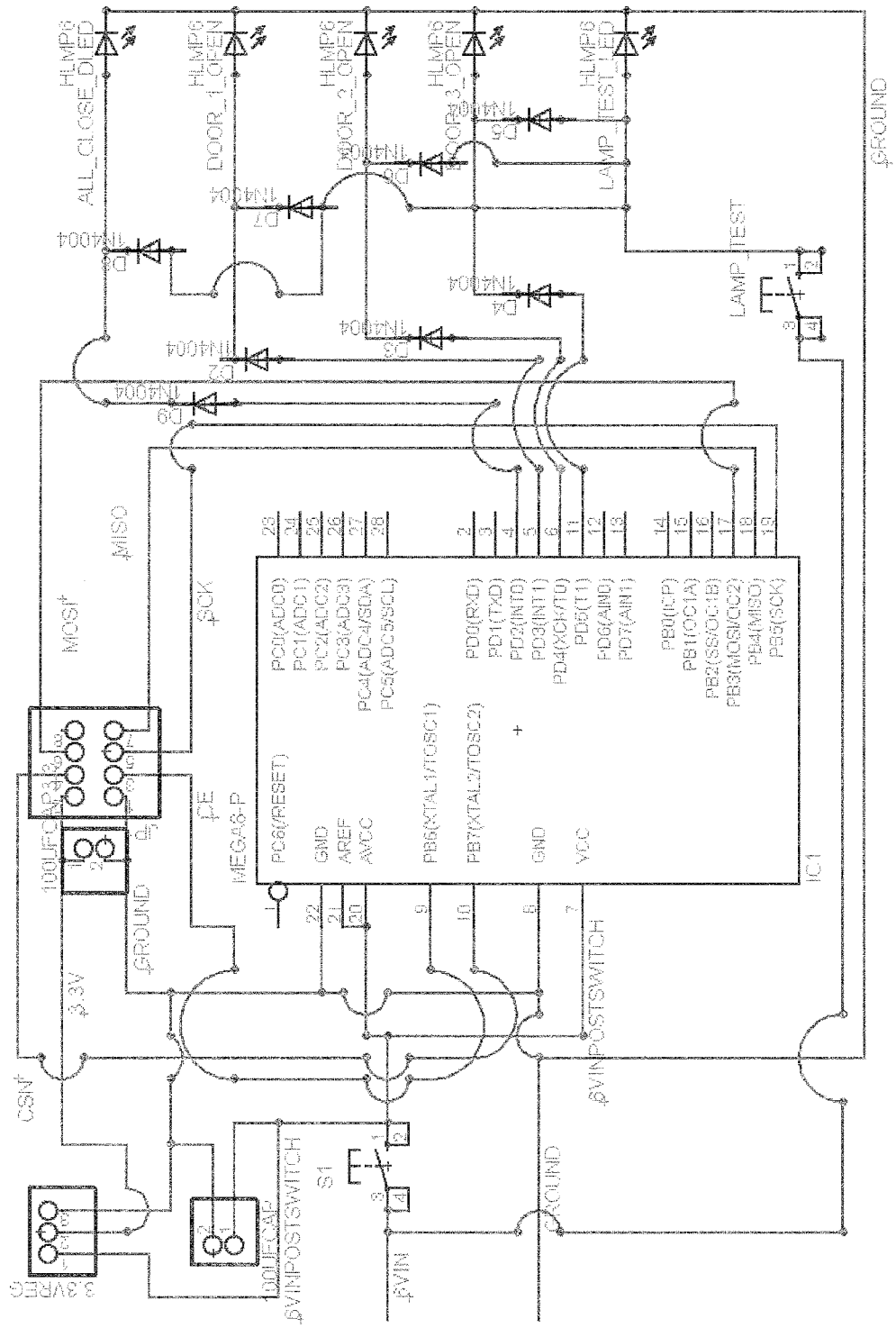
FIG. 5 is a circuit diagram of the system monitor.

FIG. 5 is a circuit diagram of the system monitor. The system monitor circuit is similar to the door sensor circuit, except the code is different and the power is supplied to the system when the switch is pushed in, instead of when the switch is allowed to spring out and open. It is also shown as a transceiver, but can be made as a receiver only. Also, as noted the system monitor has several LEDs or other lights attached to outputs from the IC1 and an extra button that will supply power to the LEDs for a lamp test. The other wiring and operation is the same as for the door sensor circuit.

Figure 6:
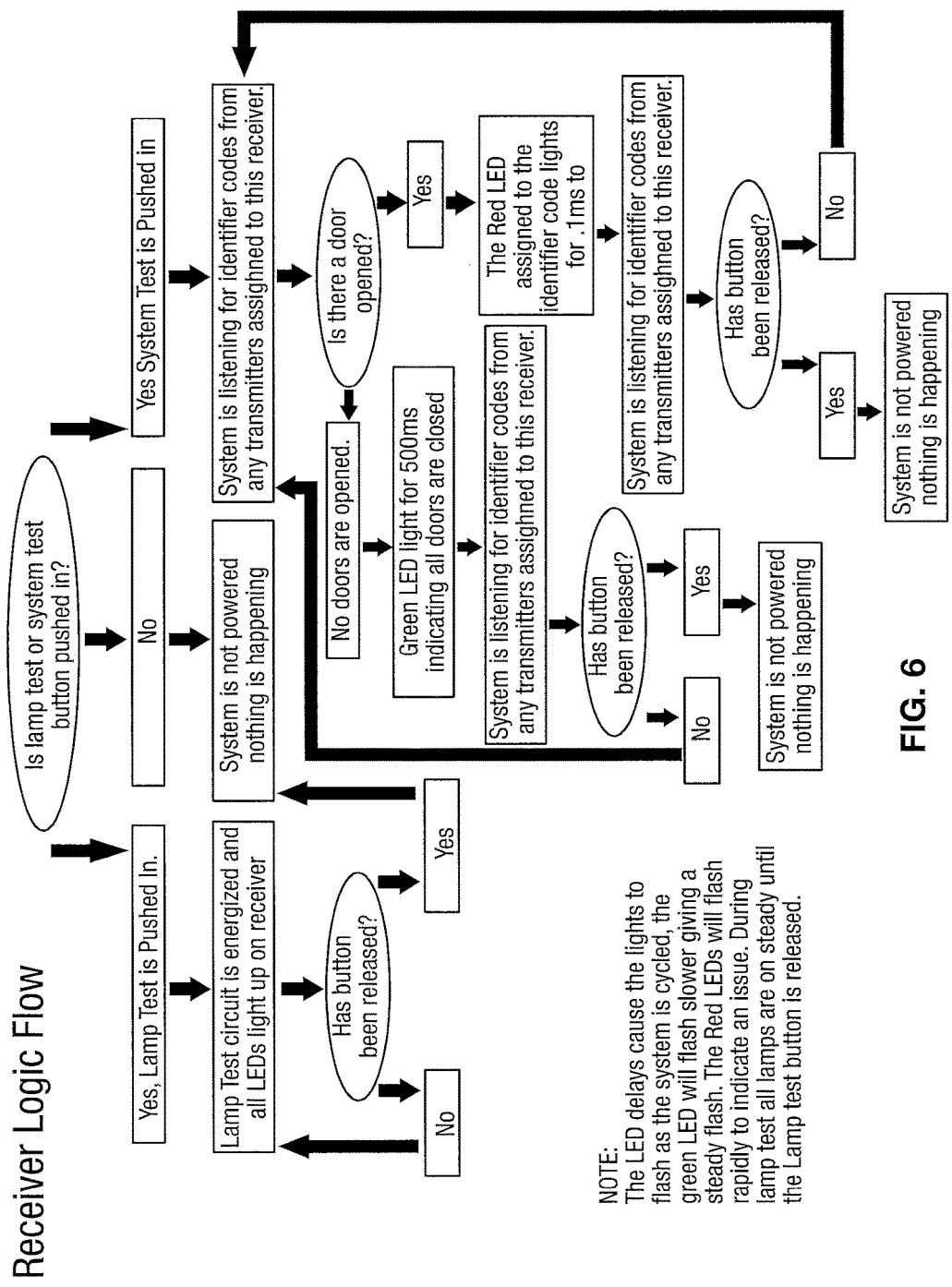
FIG. 6 is a flow chart for the operation of the system monitor, referred to in the flow chart as "receiver."

FIG. 6 is a flow chart for the operation of the system monitor. As can be seen, the system monitor has two button switches: Button 42 is activated to test the lamps or lights on the system monitor and button 44 is activated to check for an open access door. The lamp test loop is on the left in FIG. 6. When button 42 is depressed, the lamp test loop begins and essentially supplies power to all of the lights 46, 48*a*, 48*b* and 48*c*, and keeps them on as long as button 42 is depressed.

When button 44 is depressed, the system listens for any transmissions from any of the door sensor's transmitters. If no transmissions are received, power is supplied to the green LED 46 and the integrated circuit cycles at 500 milliseconds to continue to illuminate the green LED with a slow flash and this continues as long as button 44 is depressed and no doors are opened.

If any transmissions are received, the unique identifier of the transmission is interpreted in the integrated circuit to route a "switch on" signal to the red LED 48*a*, 48*b* or 48*c* associated with that unique identifier. That LED is kept on for 0.1 milliseconds, and the integrated circuit cycles back to sensing, causing a repeated signal to the red LED. The repeated 0.1 millisecond "on" timing resulting in a rapid flash to the pilot to indicate a door open. The flash continues either until the button 44 is no longer depressed or the door that was open has been closed, in which event (assuming no other doors are open), the integrated circuit will revert to the illuminating the green LED as discussed above. Of course, other durations for the lights to be on can be substituted.

Transmissions between two side-by-side aircraft are not received by the wrong aircraft because each aircraft is given a unique code to transmit. In addition, most likely the signal would not reach clearly even if all aircraft are using the 2.4 GhZ band to operate on. Each door switch sends a unique code out that the receiver in the system monitor on that plane is looking for. Every aircraft will have unique identifiers, so the systems on adjacent aircraft do not talk to each other. Any other 2.4 GhZ signal being transmitted will not interfere with transmission because this unique code is the only thing that can cause the lights on the system monitor to light up. Other suitable frequencies can be used.

If the aircraft is in flight configuration with all doors closed and system not being tested, there are no signals being sent by the door sensors or the test panel. The cockpit monitor system will only transmit a signal while the system monitor button is pressed. The door sensor units will only transmit a signal if a door is opened. This system, therefore, then allows the battery on the door sensors to be conserved, since there are only brief periods of time when these sensors will be transmitting a signal.

A maintenance system test can be performed, first doing a lamp test on the cockpit system monitor by depressing button 42 on the system monitor. Next, the doors will be opened and then closed one at a time while the cockpit system monitor button 44 is held depressed and the panel LEDs are monitored for proper operation (door open=door red LED fast flash on, all doors closed=slow flash Green LED).

The sensor units can be disassembled for battery replacement. A full system check must be accomplished if the cockpit unit is disassembled. If a specific door sensor unit is dissembled, that door must be tested. The battery packs are held in place, such as with RTV adhesive, and the leads are soldered to the power input, or plugged in via a plug connection.

The system can be used configured so it can monitor access panels on all aircraft manufactured by Boeing, Airbus, Bombardier, Embraer, etc.

Certain modifications and improvements will occur to those skilled in the art upon reading the foregoing description. It should be understood that all such modifications and improvements have been omitted for the sake of conciseness and readability, but are properly within the scope of the following claims. For example, the unit with the lights on it that receives the signals from the door sensors could be at the airport gate, instead of, or in addition to one at the cockpit. If desired, each transmitter on an aircraft can transmit at a unique frequency, as long as it is a frequency that the receiver of the system monitor can receive.

What is claimed is:

1. An apparatus for monitoring doors on an aircraft comprising
    a system monitor having a circuit with an interrogation switch, a receiver, a plurality of light sources of a first color and at least one light source of a second color, the system monitor receiver tuned to receive a door open signal when the interrogation switch is activated,
    a plurality of door sensor units, each having a housing with a transmitter, a protruding limit switch, the limit switch having a door-open position and a door-closed position and being in a sensor circuit with a battery such that battery voltage is applied to the transmitter when the limit switch is in the door-open position, so that when the limit switch is in the door-open position transmit a transmission pipe signal with a unique identifier, each door sensor unit having different unique identifier, whereby if the system monitor receives a transmission from one of the door sensor units of a door-open position signal, a corresponding one of the plurality of lights of the first color is illuminated, and if the system monitor receives no signals from any of the door sensor units, the light of the second color is illuminated.

2. An apparatus as claimed in claim 1 wherein the first color is red and the second color is green.

3. An apparatus as claimed in claim 1 wherein the system monitor is configured not to receive unless the interrogation switch is activated.

4. An apparatus as claimed in claim 1 wherein at least one of the door sensor units is configured so that it transmits only if a door is open.

5. An apparatus as claimed in claim 1 wherein at least one of the door sensor housings includes a base plate configured to mount to a surface inside a cavity behind an aircraft door and a cap to mount over the base plate to encapsulate the sensor circuit, with the limit switch protruding from the cap.

6. An apparatus as claimed in claim 5 wherein the cap is removable for battery replacement.

7. An apparatus as claimed in claim 1 wherein at least one of the door sensor units has a light that comes on when the limit switch is in the door-open position to indicate proper functioning of the door sensor unit.

8. An apparatus as claimed in claim 1 wherein the limit switch is in series with the battery to disconnect the battery from the transmitter when the switch is in the door closed position.

9. An apparatus for monitoring doors on an aircraft comprising
    a system monitor having a circuit with an interrogation switch, a receiver, a plurality of red light sources and at least one green light source, the system monitor receiver tuned to receive a door open signal when the interrogation switch is activated,
    a plurality of door sensor units, each having a housing with a transmitter, the door sensor housing including a base plate configured to mount to a surface inside a cavity behind an aircraft door and a cap to mount over the base plate to encapsulate a sensor circuit, with a limit switch protruding from the cap and the cap is removable for battery replacement, at least one of the door sensor units has a light that comes on when the limit switch is in the door-open position, the limit switch having a door-open position and a door-closed position and being in the sensor circuit with a battery such that battery voltage is only applied to the transmitter when the limit switch is in the door-open position, so that when the limit switch is in the door-open position the transmitter transmits a signal with a unique identifier, each door sensor unit having different unique identifier, the door sensor unit is configured so that it transmits only if a door is open,
    whereby if the system monitor receives a transmission from one of the door sensor units of a door-open position signal, a corresponding one of the plurality of red lights is illuminated, and if the system monitor receives no signals from any of the door sensor units, the green light is illuminated.

10. An apparatus for monitoring doors on an aircraft comprising
    a system monitor having a circuit with an interrogation switch, a receiver, an indicator capable of displaying aircraft door status information, the system monitor receiver tuned to receive a door open signal when the interrogation switch is activated,
    a plurality of door sensor units, each having a housing with a transmitter, a protruding limit switch, the limit switch having a door-open position and a door-closed position and being in a sensor circuit with a battery such that battery voltage is applied to the transmitter when the limit switch is in the door-open position, so that when the limit switch is in the door-open position transmit a transmission pipe signal with a unique identifier, each door sensor unit having different unique identifier,
    whereby if the system monitor receives a transmission from one of the door sensor units of a door-open position signal, the indicator capable of displaying aircraft door status information signifies the particular door is open corresponding to the received transmission, and if the system monitor receives no signals from any of the door sensor units, the indicator capable of displaying aircraft door status information signifies that no doors are open.

11. A method of retrofitting aircraft to allow monitoring of access panel door positions comprising
    mounting in a cockpit of an aircraft a system monitor having a circuit with an interrogation switch, a receiver, a plurality of light sources of a first color and at least one light source of a second color, the system monitor transmitting an interrogation signal from the system monitor's transmitter when the interrogation switch is activated,
    mounting a door sensor unit behind each of a plurality of access panel doors on the aircraft, each door sensor unit having a housing with a protruding limit switch, the limit switch having a door-open position and a door-closed position and being in a sensor circuit with a battery, and a transmitter,
    when the limit switch is in the door-open position the sensor circuit configured to be in a mode to transmit a signal with a unique identifier, so that each of the transmitters of the door sensor units transmit an identifier that is different from the other door sensor units,
    thereby enabling the system monitor to receive a transmission from one of the door sensor units of a door-open position signal and illuminate a corresponding one of the plurality of lights of the first color, and if the system monitor receives no door-open position signals from the door sensor units, the light of the second color is illuminated.

12. A method as claimed in claim 11 wherein the first color is red and the second color is green.

13. A method as claimed in claim 11 wherein mounting the door sensor includes mounting a base plate to a surface inside a cavity behind an aircraft door with a cap over the base plate to encapsulate the sensor circuit, with the limit switch protruding from the cap to be activated by the opening and closing of the aircraft door.

* * * * *